US 6,463,921 B2

(12) United States Patent
Shimazaki et al.

(10) Patent No.: US 6,463,921 B2
(45) Date of Patent: Oct. 15, 2002

(54) ABRASIVE WIRE FOR A WIRE SAW AND A METHOD OF MANUFACTURING THE ABRASIVE WIRE

(75) Inventors: Yutaka Shimazaki, Kanagawa; Toshiyuki Enomoto; Yasuhiro Tani, both of Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/495,307

(22) Filed: Feb. 1, 2000

(65) Prior Publication Data

US 2002/0100469 A1 Aug. 1, 2002

(30) Foreign Application Priority Data

Feb. 4, 1999 (JP) .......................................... 11-027857
Jul. 15, 1999 (JP) .......................................... 11-202224
Jul. 15, 1999 (JP) .......................................... 11-202225
Jul. 16, 1999 (JP) .......................................... 11-203220
Jul. 16, 1999 (JP) .......................................... 11-203222

(51) Int. Cl.[7] .............................................. B28D 1/08
(52) U.S. Cl. ................................. 125/21; 125/22; 51/295
(58) Field of Search ........................ 125/21, 22; 51/295

(56) References Cited

U.S. PATENT DOCUMENTS

| 2,793,478 | A |   | 5/1957  | Rohowetz         |         |
|-----------|---|---|---------|------------------|---------|
| 4,172,440 | A | * | 10/1979 | Schneider et al. | 125/21  |
| 5,218,949 | A | * | 6/1993  | Tomlinson et al. | 125/21  |
| 5,551,960 | A | * | 9/1996  | Christianson     | 51/295  |
| 5,633,068 | A |   | 5/1997  | Ryoke et al.     |         |
| 6,070,570 | A | * | 6/2000  | Ueoka et al.     | 125/21  |

FOREIGN PATENT DOCUMENTS

| EP | 0 916 449    | 5/1999  |
| JP | 63-022275    | 1/1988  |
| JP | 4-004105     | 1/1992  |
| JP | 7-227767     | 8/1995  |
| JP | 8-126953     | 5/1996  |
| JP | 8-174402     | 7/1996  |
| JP | 9-150314     | 6/1997  |
| JP | 9-155631     | 6/1997  |
| JP | 10-138114    | 5/1998  |
| JP | 10-151560    | 6/1998  |
| JP | 10-315049    | 12/1998 |
| JP | 10-328932    | 12/1998 |
| JP | 10-337612    | 12/1998 |
| JP | 11-048035    | 2/1999  |
| JP | 11-207598    | 8/1999  |
| WO | WO 97/33937  | 9/1997  |
| WO | WO 98/35784  | 8/1998  |

OTHER PUBLICATIONS

"Cutting Technique of a Larger Diameter Wafer by a Wire Saw", Electronic Material, Jul. 1996, pp. 29–33.
T. Murai, et al., "Wiremond" Sumitomo Electric Company Report, Mar. 1988, vol. 132, pp. 118–122.
Hideki Ogawa, et al., "Cutting Performances of Bonded Abrasives Type Diamond Wire Saw", The Society of Grinding Engineers 1997 Symposium Proceedings, 1997, pp. 369–370.

* cited by examiner

Primary Examiner—M. Rachuba
(74) Attorney, Agent, or Firm—Oblon, Spivak, McClelland, Maier & Neustadt, P.C.

(57) ABSTRACT

An abrasive wire provides an efficient cutting operation with high accuracy and a longer service life. Abrasive grains are provided around a core wire. The abrasive grains are bonded to the core wire by a light curing resin or an electron beam curing resin which can be cured within a few seconds. Accordingly, the curing operation can be performed while the core wire is moved in the direction of the longitudinal axis of the core wire. Thus, a long abrasive wire can be fabricated at reduced time and cost.

7 Claims, 11 Drawing Sheets

ABRASIVE WIRE FOR A WIRE SAW AND A METHOD OF MANUFACTURING THE ABRASIVE WIRE

BACKGROUND OF THE INVENTION

1. Field of the Invention

The present invention generally relates to an abrasive wire for a wire saw and, more particularly, to an abrasive wire having resin-bonded abrasive grains for cutting a hard, brittle material such as a silicon ingot, crystal, quartz or a metal.

2. Description of the Related Art

An abrasive wire saw is known as a cutting tool for cutting a hard, brittle material such as a silicon ingot, crystal, quartz or a metal. Recently, the abrasive wire saw has attracted attention as a cutting tool especially for cutting a silicon ingot to prepare a large diameter silicon wafer used for manufacturing semiconductor devices. Conventionally, an inner-blade disc saw has been used for cutting a silicon ingot. The diameter of the inner-blade disc saw has become larger and larger as the diameter of the silicon wafer formed from a silicon ingot has been increased.

However, there is a limitation to increasing the diameter of the inner-blade disc saw. That is, if the diameter of the inner-blade disc saw is increased to cut a silicon ingot having a diameter of more than 8 inches, there are problems in that: there is a limitation in increasing the throughput; the kerf loss is large; and it is difficult to attach the inner-blade disc saw to a cutting jig. Accordingly, the method for cutting a silicon ingot using the inner-blade disc saw has been replaced by a multi wire cutting method.

FIG. 1 shows a structure of a conventional wire cutting apparatus for cutting a silicon ingot using the multi wire cutting method. The wire cutting apparatus shown in FIG. 1 uses a wire 1 such as a piano wire. The wire 1 is supplied from a new wire reel 2 and is wound on a winding roller 5. Between the new wire reel 2 and the winding roller 5, the wire 1 is engaged with dancer rollers 3 and a plurality of main rollers 4. The wire 1 forms a plurality of parallel lines having a predetermined pitch therebetween by being engaged with the main rollers 4 as shown in FIG. 1. An abrasive slurry having a high viscosity is supplied onto the wire 1 from slurry nozzles 7 so that the abrasive slurry adheres to the wire 1 forming the parallel lines. A silicon ingot 6 is pressed against the wire 1 while the wire 1 is moving and the abrasive slurry is being supplied onto the wire 1. Thus, the silicon ingot is cut by the abrasive slurry adhering to the wire 1.

The above-mentioned cutting method has the following problems due to the abrasive slurry which must be disposed of as industrial waste:

1) a large amount of industrial waste is generated;
2) the working environment is extremely bad;
3) operating costs are high;
4) it is difficult to clean the silicon wafers after being cut;
5) it is difficult to increase cutting efficiency; and
6) accuracy of cutting is low.

In order to solve the above-mentioned problems, an electrodeposition abrasive wire which comprises abrasives attached to a core wire has been developed. Such an abrasive wire is disclosed in Japanese Laid-Open Patent Applications No. 63-22275, No. 4-4105, No. 7-227767 and No. 9-150314. Additionally, an abrasive wire having abrasives mechanically embedded in a wire material is disclosed in Sumitomo Electric Company Report, 1988 March, Vol. 132, pp.118–122. These abrasive wires use a metal to bond abrasive grains to a core wire.

However, the abrasive wire using a metal as a bonding material has low strength with respect to torsion and bend since the bonding material layer is hard. Accordingly, such an abrasive wire can be easily cut. Additionally, the manufacturing cost of the electrodeposition abrasive wire is high since it takes a long time to bond the abrasives by electrodeposition. Further, the abrasive wire cannot be made long enough for the multi wire cutting method. In order to eliminate the problem related to the length of the abrasive wire, an endless type abrasive wire made by joining opposite ends of a short wire has been suggested. However, there is a problem in that such an endless type abrasive wire has extremely low strength with respect to torsion and bend.

In order to solve the above-mentioned problems, an abrasive wire using a resin as a bonding material has been developed. Such a resin bonded abrasive wire and a manufacturing method thereof is disclosed in "Cutting Performances of Bonded Abrasives type Diamond Wire Saw", The Society of Grinding Engineers 1997 Symposium Proceedings, pp.369–370. Such a resin bonded abrasive wire is also disclosed in Japanese Laid-Open Patent Applications No. 8-126953, No. 9-155631, No. 10-138114, No. 10-151560, No. 10-315049, No. 10-328932 and No. 10-337612. None of the literature or the patent documents refers to the type of resin to be used to bond the abrasives. However, according to their contents of disclosure and embodiments described therein, the resin is supposed to be a thermosetting resin such as a phenol resin, which has been used for grinding wheels.

However, in the above-mentioned improved abrasive wire, a drying process for removing solvent from the bonding material and a thermal curing process for curing the bonding material are needed since a thermosetting resin is used as the bonding material. The time period required for the thermal curing process is a few minutes for each part of the abrasive wire.

Additionally, Japanese Laid-Open Patent Application No. 11-48035 discloses an abrasive wire using a ceramic to bond abrasive grains so as to increase holding strength of the abrasive grains. However, the temperature for forming such a ceramic bonding layer is very high and a time period for forming the ceramic bonding layer is a few minutes.

Accordingly, it is difficult to fabricate the resin bonded abrasive wire or the ceramic bonded abrasive wire at speeds in the range of a few hundred meters per minute to a few kilometers per minute. Thus, it is very difficult to fabricate the resin bonded abrasive wire or the ceramic bonded abrasive wire having a length of more than 10 kilometers, which is required for the multi wire cutting method, at a low cost.

Additionally, the resin bonded abrasive wire is inferior to the metal bonded abrasive wire with respect to the abrasion resistance, mechanical strength, heat resistance and cutting ability.

SUMMARY OF THE INVENTION

It is a general object of the present invention to provide an improved and useful abrasive wire and a manufacturing method thereof in which the above-mentioned problems are eliminated.

A more specific object of the present invention is to provide an abrasive wire which provides an efficient cutting operation with high accuracy and a long service life.

Another object of the present invention is to provide an abrasive wire which can be made long enough for the multi wire cutting method at a low manufacturing cost.

In order to achieve the above-mentioned objects, there is provided according to one aspect of the present invention an abrasive wire comprising: a core wire; abrasive grains provided around the core wire; and a bonding layer formed on the core wire so as to bond the abrasive grains to the core wire, the bonding layer being formed by a light curing resin.

According to the above-mentioned invention, the time period for manufacturing the abrasive wire can be reduced since the light curing resin can be cured in a very short time. The mechanical strength and heat resistance of the abrasive wire can be increased by adding a filler such as inorganic particles or fibers to the bonding layer. Additionally, the adhesion of the bonding layer can be increased by providing a primer to the core wire prior to the formation of the bonding layer, thereby increasing the service life of the abrasive wire.

The bonding layer may include a plurality of layers each of which is made of a light curing resin having different characteristic. That is, a first layer contacting the core wire may be made of a light curing resin adhesive layer having adhesive force stronger than the light curing resin forming other layers. By adding the abrasive particles to the first layer, the abrasive particles can be securely bonded to the core wire. Additionally, the outermost layer may be made of a light curing resin having abrasion resistance.

Additionally, there is provided according to another aspect of the present invention a method for manufacturing an abrasive wire, comprising the steps of: applying a light curing resin liquid to a core wire while the core wire is moved in the direction of the longitudinal axis of the core wire, the light curing resin liquid containing abrasive grains; and curing the light curing resin liquid adhering to the core wire by projecting a light on the light curing resin liquid while the core wire is moved in the direction of the longitudinal axis of the core wire so as to bond the abrasive grains to the core wire.

According to this invention, the light curing resin is used for bonding the abrasive grains to the core wire. Since the light curing resin can be cured within a few seconds, the curing operation can be performed while the core wire is moved in the direction of the longitudinal axis of the core wire. Accordingly, a long abrasive wire can be fabricated at reduced time and cost.

Additionally, there is provided according to another aspect of the present invention an abrasive wire comprising: a core wire; abrasive grains provided around the core wire; and a bonding layer formed on the core wire so as to bond the abrasive grains to the core wire, the bonding layer being formed by an electron beam curing resin.

According to the above-mentioned invention, a time period for manufacturing the abrasive wire can be reduced since the electron beam curing resin can be cured in a very short time. The mechanical strength and heat resistance of the abrasive wire can be increased by adding a filler such as inorganic particles or fibers to the bonding layer. Additionally, the adhesion of the bonding layer can be increased by providing a primer to the core wire prior to the formation of the bonding layer, thereby increasing the service life of the abrasive wire.

The bonding layer may include a plurality of layers each of which is made of an electron beam curing resin having different characteristic. That is, a first layer contacting the core wire may be made of an electron beam curing resin adhesive layer having adhesive force stronger than the electron beam curing resin forming other layers. By adding the abrasive particles to the first layer, the abrasive particles can be securely bonded to the core wire. Additionally, the outermost layer may be made of a light curing resin having abrasion resistance.

Additionally, there is provided according to another aspect of the present invention a method for manufacturing an abrasive wire, comprising the steps of: applying an electron beam curing resin liquid to a core wire while the core wire is moved in a direction of a longitudinal axis of the core wire, the electron beam curing resin liquid containing abrasive grains; and curing the electron beam curing resin liquid adhering to the core wire by projecting an electron beam on the light curing resin liquid while the core wire is moved in the direction of the longitudinal axis of the core wire so as to bond the abrasive grains to the core wire.

According to this invention, the electron beam curing resin is used for bonding the abrasive grains to the core wire. Since the electron beam curing resin can be cured within one second, the curing operation can be performed while the core wire is moved in the direction of the longitudinal axis of the core wire. Accordingly, a long abrasive wire can be fabricated at reduced time and cost.

Other objects, features and advantages of the present invention will become more apparent from the following detailed descriptions when read in conjunction with the accompanying drawings.

DETAILED DESCRIPTION OF THE PREFERRED EMBODIMENTS (First Embodiment)

Figure 1:
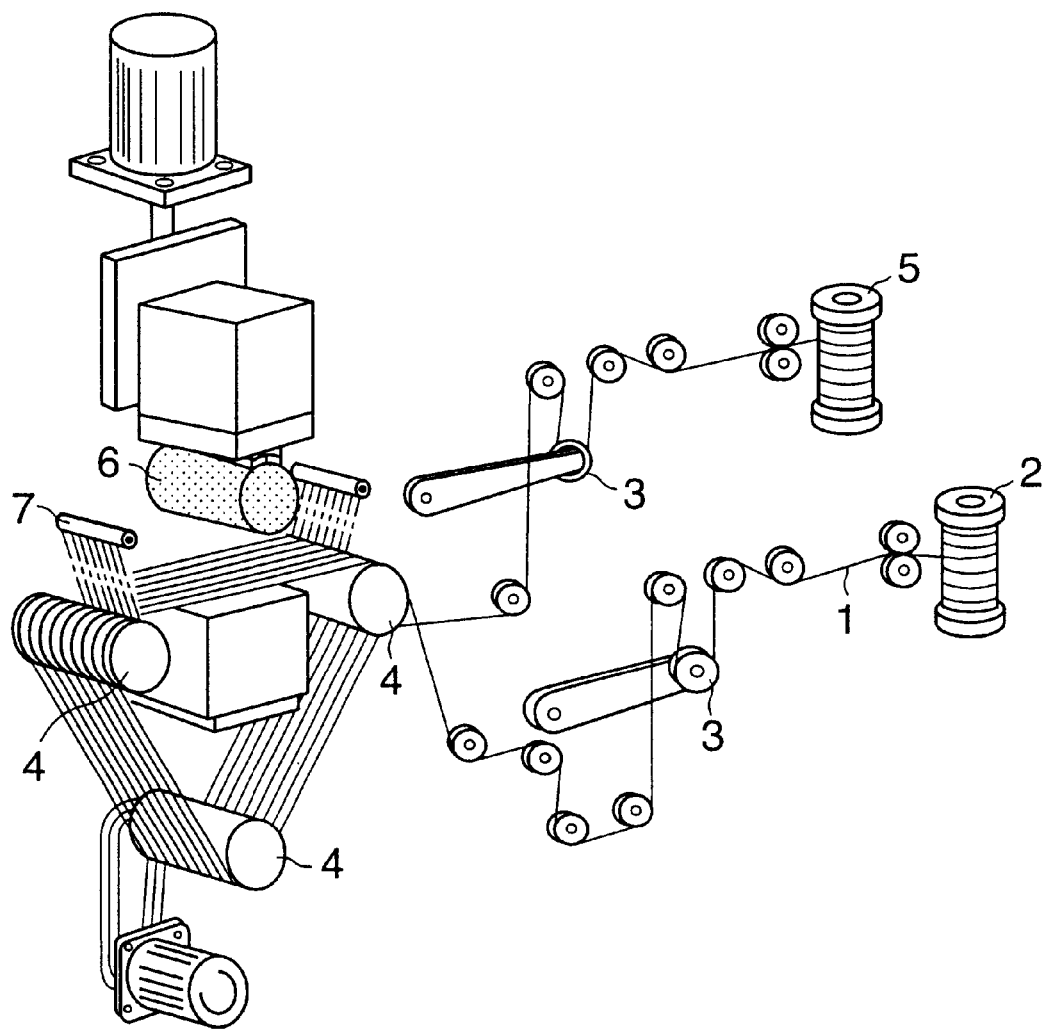
FIG. 1 is an illustration of a structure of a conventional wire cutting apparatus using a multi wire cutting method.
Figure 2:
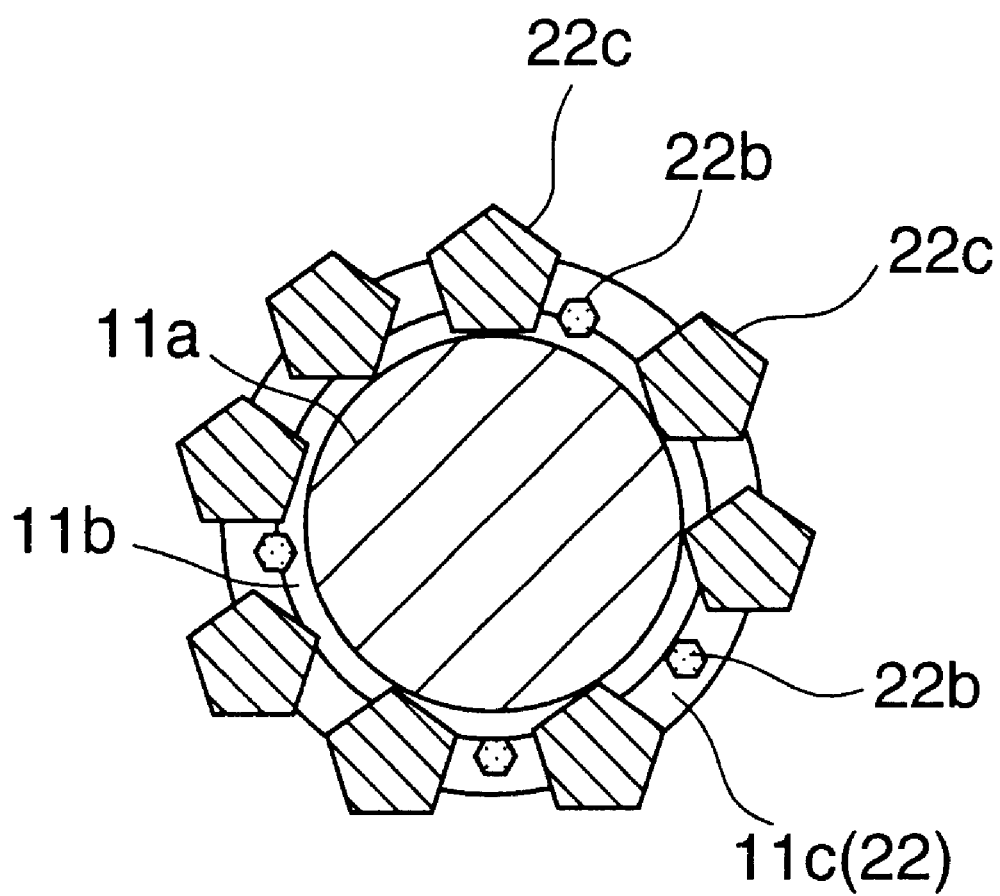
FIG. 2 is an illustration of a cross section of an abrasive wire according to a first embodiment of the present invention.
Figure 3:
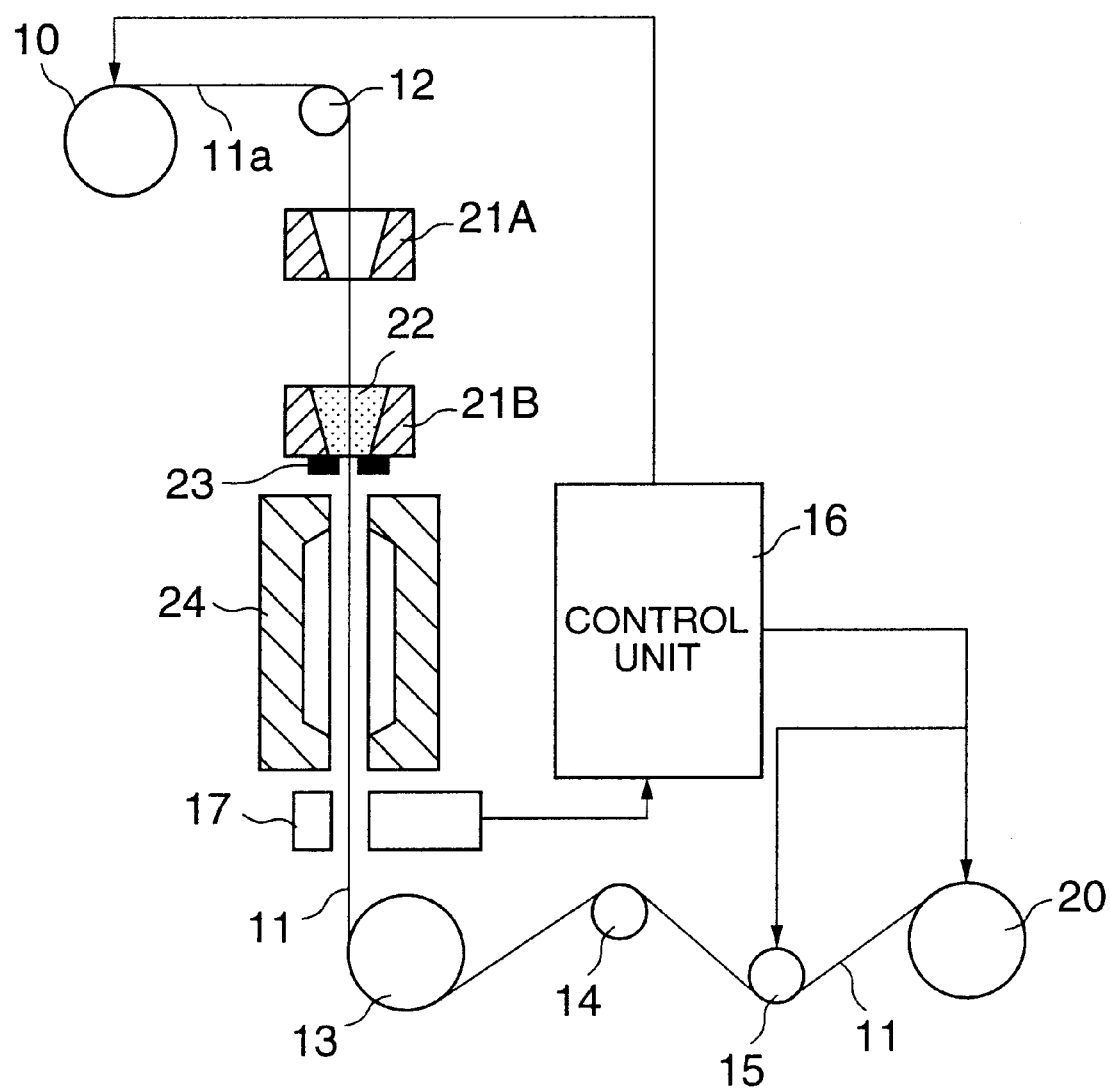
FIG. 3 is a schematic illustration of a manufacturing apparatus for manufacturing the abrasive wire according to the first embodiment of the present invention.

A description will now be given, with reference to FIGS. 2 and 3, of a first embodiment of the present invention. FIG. 2 is an illustration of a cross section of an abrasive wire according to the first embodiment of the present invention. FIG. 3 is a schematic illustration of a manufacturing apparatus for manufacturing the abrasive wire according to the first embodiment of the present invention.

The abrasive wire 11 according to the first embodiment of the present invention comprises a core wire 11a, abrasive grains 22c bonded to the core wire 11a and a light curing resin layer 11c formed on the core wire 11a so as to bond the abrasive grains 22c to the core wire 11a. A primer layer 11b is provided between the core wire 11a and the light curing resin layer 11c so that the light curing resin layer 11c securely adheres to the core wire 11a. This prevents removal of the light curing resin layer 11c from the abrasive wire 11 during a cutting operation, thereby increasing the service life of the abrasive wire 11. Additionally, the light curing resin layer 11c contains a filler 22b so as to increase the mechanical strength and heat resistance of the abrasive wire 11.

Specifically, the core wire 11a is made of a metal wire such as a piano wire, a bronze coated piano wire or a stainless steel wire. The core wire 11a can also be made of an inorganic material such as a glass fiber or an organic material such as nylon. The core wire 11a can be a solid wire or a twisted wire.

The abrasive grains 22c are preferably made of a hard material such as diamond, cubic boron nitride (CBN), alumina or silicon carbide. A diamond grain is most preferable for the abrasive grains 22c since the diamond grain has superiority in cutting ability.

The light curing resin layer 11c is made of a light curing resin such as an ultraviolet curing resin or a visible light curing resin which can be polymerized within a few seconds under irradiation of an ultraviolet light or a visible light, respectively. Such a light curing resin is generally used as a coating material of an optical fiber. Thus, the abrasive wire 11 can be fabricated at a speed the same as that of the optical fiber, which is in the range of about a few hundred meters per minute to a few kilometers per minute, thereby enabling the fabrication of a long abrasive wire at a low cost.

It should be noted that when an ultraviolet light curing resin is used as the light curing resin, an ultraviolet light having a wavelength of 200 nm to 400 nm is preferably used. A light source for generating such an ultraviolet light can be a high-pressure mercury lamp, a metal halide lamp, a He—Cd laser or an Ar laser. When a visible light curing resin is used, a light having a wavelength peak in the range of 400 nm to 800 nm may be used.

As for the filler 22b added to the light curing resin, metal particles having a diameter of 0.1 $\mu$m to 15 $\mu$m and/or inorganic particles having an average diameter of 0.1 $\mu$m to 15 $\mu$m may be used. Metal fibers having a diameter of 0.1 $\mu$m to 15 $\mu$m and a length of 1 $\mu$m to 200 $\mu$m and/or inorganic fibers having a diameter of 0.1 $\mu$m to 15 $\mu$m and a length of 1 $\mu$m to 200 $\mu$m may be used. The filler 22b is added to the light curing resin so that the mixture contained the filler 22b by 5% to 90% by weight (5 to 90 wt %). The addition of the filler 22b increases the mechanical strength and the heat resistance of the abrasive wire 11.

It should be noted that the curing speed of the light curing resin may be reduced or the light curing resin may not be completely cured due to transmission, absorption or reflection of light at or near the particles of the filler 22b. However, such a problem can be eliminated by appropriately selecting the type, size and amount of the filler 22b.

A description will now be given, with reference to FIG. 3, of a manufacturing method for the abrasive wire 11 according to the first embodiment of the present invention.

The core wire 11a wound on a feed roller 10 is supplied to a first chamber 21A via a roller 12 after the core wire 11a is subjected to a degreasing process. The first chamber 21A, having a funnel shape, contains a primer so that the primer layer 11b is formed on the core wire 11a while the core wire 11a passes through the first chamber 21A. The primer layer 11b improves adhesion of the light curing resin to the core wire 11a and promotes the cure of the light curing resin. As for the primer forming the primer layer 11b, a photopolymerization accelerator or a coupling agent such as a silane coupling agent can be used.

Japanese Laid-Open Patent Application NO. 10-328932 teaches provision of unevenness on the surface of a core wire so as to increase adhesion of a resin layer to the core wire. If such a structure is applied to the abrasive wire 11, the mechanical strength of the abrasive wire 11 may be decreased. However, the formation of the primer layer 11b does not influence the mechanical strength of the abrasive wire 11.

The core wire 11a on which the primer layer 11b has been formed is passed through a resin applying chamber 21B having a funnel shape. The resin applying chamber 21B contains a mixture liquid 22 comprising the light curing resin containing the abrasive grains 22c and the filler 22b. The abrasive grains 22c adhere to the core wire 11a due to the light curing resin while the core wire 11a passes through the resin applying chamber 21B. After passing through the resin applying chamber 21B, the core wire 11a is passed through a diameter setting jig 23 so as to remove any excessive amount of the mixture liquid 22 adhering on the core wire 11a. Accordingly, the light curing resin layer 11c is adjusted to have a predetermine thickness, and, thereby, the abrasive wire 11 is set to have a predetermined diameter.

The core wire 11a after passing through the diameter jig 23 enters a light irradiating apparatus 24 which projects a light onto the mixture liquid applied to the core wire 11a. The light curing resin contained in the mixture liquid 22 is cured by the light projected by the light irradiating apparatus 24, and, thereby, the light curing resin layer 11c is formed. Accordingly, the abrasive grains 22c are securely bonded to the core wire 11a by the light curing resin layer 11c, and, thereby, the abrasive wire 11 shown in FIG. 2 is formed.

After the thus-formed abrasive wire 11 exits the light irradiating apparatus 24, the diameter of the abrasive wire 11 is measured by a diameter measuring device 17. The measurement taken by the diameter measuring device 17 is supplied to a control unit 16. The diameter measuring device 17 includes three non-contact displacement sensors arranged in equiangular positions surrounding the abrasive wire 11 exiting the light irradiating apparatus 24 so as to measure eccentricity of the light curing resin layer 11c with respect to the core wire 11a as well as the diameter of the abrasive wire 11. Specifically, the diameter measuring device 17 is capable of measuring the thickness of the light curing resin layer 11c at three different locations around the circumference of the abrasive wire 11.

The control unit 16 detects eccentricity between the abrasive wire 11 and the diameter setting jig 23 based on the measurement by the diameter measuring device 17 so as to control the position of the diameter setting jig 23 so that the abrasive wire 11 is always located in the center of the diameter setting jig 23. The relative position of the core wire 11a with respect to the diameter setting jig 23 can be changed by moving the diameter setting jig 23 or moving a wire position adjusting roller (not shown in the figure). Additionally, the control unit 16 controls the feed speed of the core wire 11a so that the thickness of the light curing resin layer 11c becomes uniform in the longitudinal direction as well as radial directions of the core wire 11a.

After passing through the diameter measuring device 17, the abrasive wire 11 is directed to a winding roller 20 via rollers 13, 14 and 15, and is wound on the winding roller 20. The winding speed of the winding roller 20 is controlled by the control unit 16. Additionally, the tension of the abrasive wire 11 is controlled by the roller 15.

It should be noted that the process for curing the light curing resin may be performed within a nitrogen atmosphere or an oxygen reduced atmosphere so as to achieve stable polymerization of the light curing resin.

According to the above-mentioned abrasive wire manufacturing apparatus, the abrasive wire 11 can be continuously fabricated at a speed of a few hundred meters per minutes to a few kilometers per minutes since the light curing resin, which bonds the abrasive grains 22c to the core wire 11a, is cured in a short time, that is, within a few seconds. Additionally, since the diameter of the abrasive wire 11 is adjusted by the diameter setting jig 23 under the control of the control unit 16, the abrasive wire 11 has a uniform thickness along the longitudinal direction as well as radial directions. Accordingly, when a silicon ingot is cut by the abrasive wire 11, the kerf loss is reduced and a good cutting quality can be achieved.

A description will now be given of an example of the abrasive wire 11, which was fabricated by the abrasive wire manufacturing apparatus shown in FIG. 3.

Fine powder of copper having an average diameter of 2 $\mu$m was added to a radical polymerization type light curing resin liquid so that the mixture contained 30% fine copper powder by weight. The radical polymerization type light curing resin liquid contained an acrylate prepolymer (an oligomer or a monomer) and 1% (1 wt %) photoinitiator of an acetophenone derivative by weight. The solution was mixed by a homogenizer for 10 minutes. Diamond abrasive grains having a diameter of 30 $\mu$m to 40 $\mu$m, which corresponds to 5 volume percent, were wetted with a small amount of ethyl alcohol, and added to the resin liquid so as to prepare the mixture liquid 22. The mixture liquid 22 was mixed by a homogenizer for 10 minutes. The thus-prepared mixture liquid 22 was provided to the resin applying chamber 21B. Thereafter, a piano wire having a diameter of 0.20 mm was introduced into the resin applying chamber 21B so that the piano wire was covered by the mixture liquid 22 including the diamond abrasive grains. Then, the piano wire was passed through the diameter setting jig 23 having an opening of which diameter is about 0.27 mm. The piano wire was passed through the light irradiating apparatus which comprises a high-voltage mercury lamp having a peak wavelength around 354 nm. An abrasive wire having a diameter of 0.25 mm to 0.26 mm was obtained.

The light curing resin used in the above-mentioned example was a radical polymerization type resin of which radical polymerization of the oligomer or monomer is induced by a free radical generated by the photoinitiator being irradiated by the ultraviolet light. However, the oligomer, the monomer and the photoinitiator are not limited to those used in the above-mentioned example, and unsaturated polyester may be used as the oligomer and styrene may be used as the monomer.

As for the oligomer other than the above, poly(ester acrylate), poly(ether acrylate), acrylic oligomer acrylate, epoxy acrylate, polybutadiene acrylate or silicon acrylate may be used. As for the monomer other than the above, N-vinyl pyrolidone, vinyl acetate, monofunctonal acrylate, bifunctional acrylate or trifunctional acrylate may be used. As for the polymerization initiator, an acetophenone derivative such as acetophonone or trichloro acetophenone, benzoin ether, benzophenone or xanthone may be used. Additionally, as for the light curing resin, a resin of a light addition polymerization type, a light cationic polymerization type or an acid curing type may be used instead of the radical polymerization type.

Additionally, the fine powder of copper was used as the filler 22b in the above-mentioned example, the filler 22b is not limited to the fine powder of copper. That is, any material can be used as long as the material can improve the mechanical strength or the abrasion resistance of the light curing resin layer 11b without adversely affecting the completion of the cure of the light curing resin. As for the filler, fine metal powder, metal oxide, metal carbide or non-metal oxide or carbide such as a semiconductor device material may be used. The filler may be in the form of a particle or a fiber.

A 3-inch diameter silicon ingot was cut by the above-mentioned example of the abrasive wire 11 at a cutting speed of 300 m/min. There was no remarkable abrasion of the bonding layer (light curing resin layer 11c). The average cutting efficiency was more than 35 mm$^2$/min.

(Second Embodiment)

Figure 4:
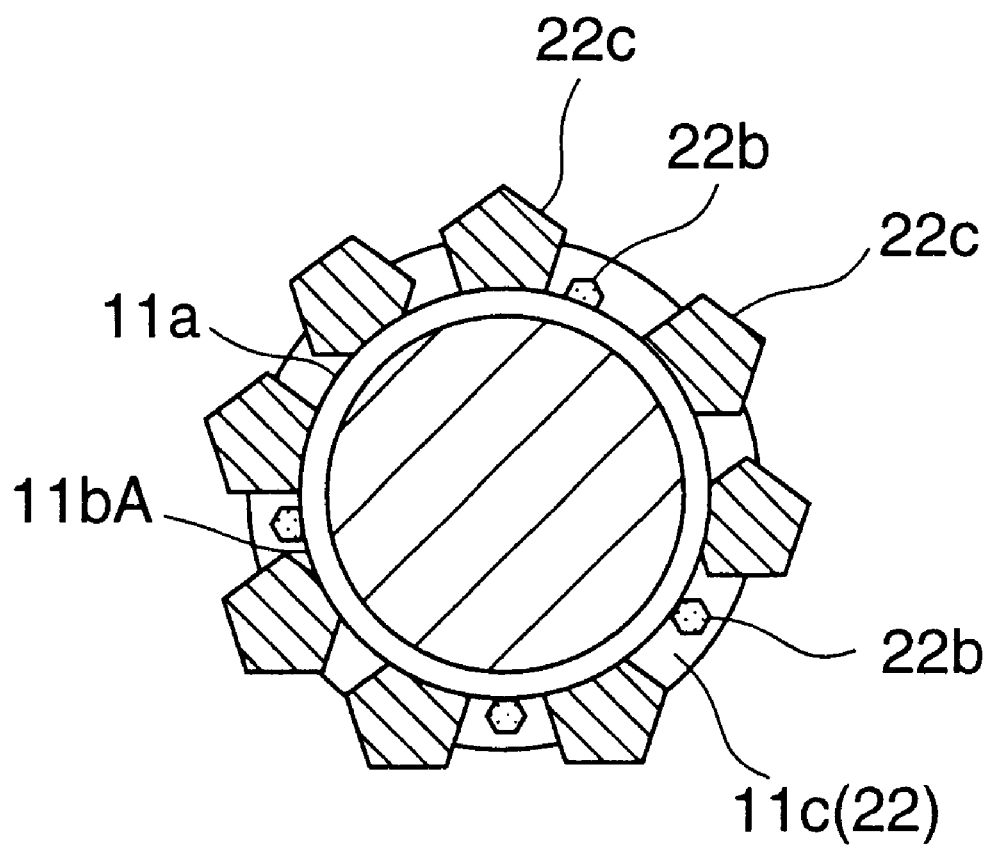
FIG. 4 is an illustration of a cross section of an abrasive wire according to a second embodiment of the present invention.

A description will now be given of a second embodiment of the present invention. FIG. 4 is an illustration of a cross section of an abrasive wire according to the second embodiment of the present invention. In FIG. 4, parts that are the same as the parts shown in FIG. 2 are given the same reference numerals, and descriptions thereof will be omitted.

The abrasive wire 11A according to the second embodiment of the present invention has the same structure as that of the abrasive wire 11 according to the first embodiment of the present invention except for the primer layer 11b of the abrasive wire 11 being replaced by a light curing resin adhesive layer 11bA. The light curing resin adhesive forming the light curing resin adhesive layer 11bA adheres to the core wire 11a stronger than the light curing resin forming the light curing resin layer 11c. Additionally, the light curing resin forming the light curing resin layer 11c strongly adheres to the light curing resin adhesive layer 11bA. Accordingly, the light curing resin layer 11c adheres to the core wire 11a stronger than when the light curing resin layer 11c is directly formed on the core wire 11a without the light curing resin adhesive layer 11bA. Thus, the abrasive grains 22c are more firmly bonded to the core wire 11a than when the abrasive grains 22c are bonded to the core wire 11a solely by the light curing resin layer 11c.

Figure 5:
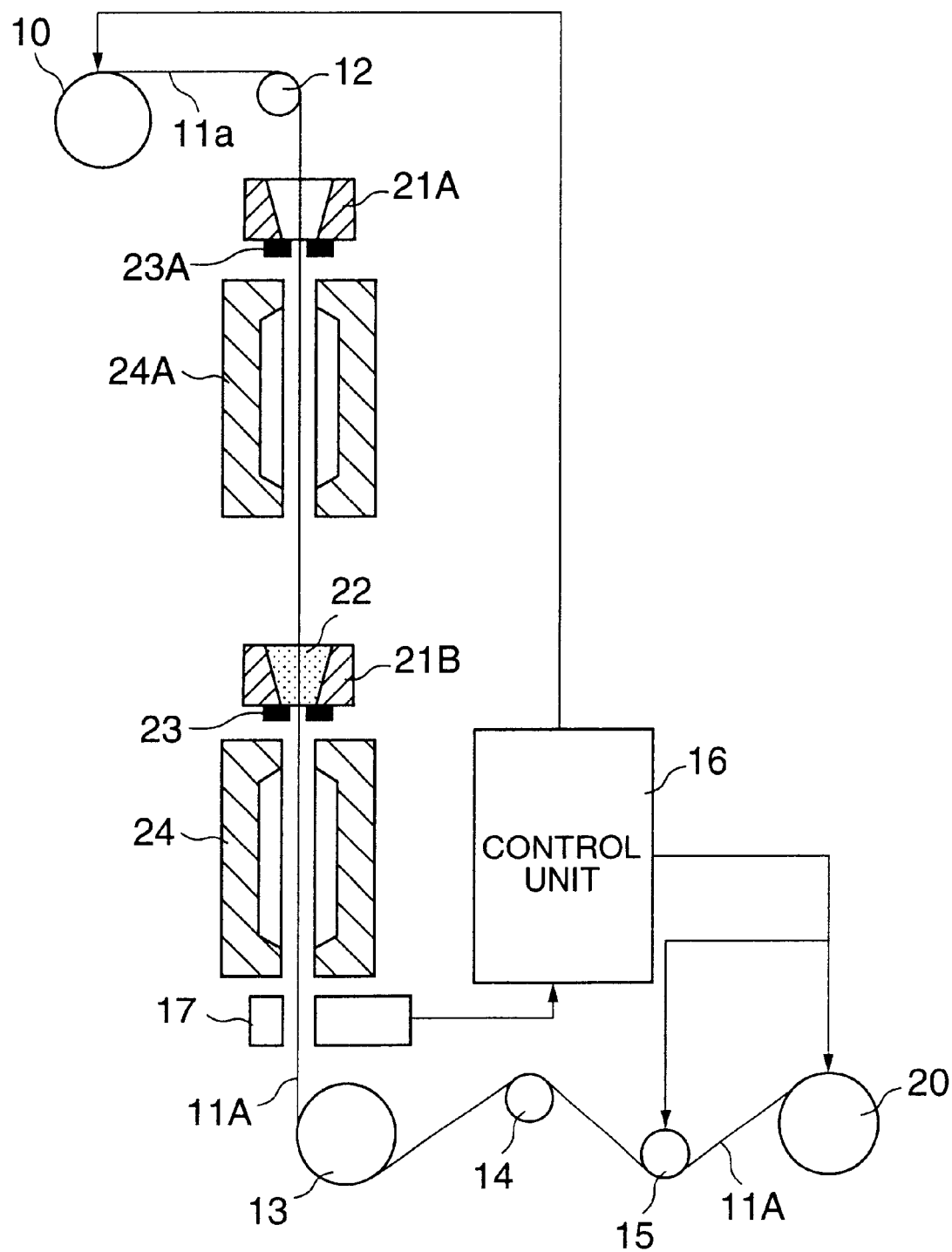
FIG. 5 is a schematic illustration of a manufacturing apparatus for manufacturing the abrasive wire according to the second embodiment of the present invention.

A description will now be given, with reference to FIG. 5, of a manufacturing method of the abrasive wire 11A according to the second embodiment of the present invention. FIG. 5 is a schematic illustration of a manufacturing apparatus for manufacturing the abrasive wire 11A according to the second embodiment of the present invention. In FIG. 5, parts that are the same as the parts shown in FIG. 3 are given the same reference numerals, and descriptions thereof will be omitted.

In the manufacturing apparatus shown in FIG. 5, the light curing resin abrasive forming the light curing resin abrasive layer 11bA is provided in the first chamber 21A. A diameter setting jig 23A having the same structure as the diameter setting jig 23 is provided at the exit of the chamber 21A. The diameter setting jig 23A removes any excessive amount of the light curing resin adhesive adhering to the core wire 11a.

After exiting the diameter setting jig 23A, the core wire 11a enters a light irradiating apparatus 24A having the same structure as the electron beam irradiating apparatus 24. Thus, the light curing resin adhesive adhering to the core wire 11a is cured by the light projected by the light irradiating apparatus 24A. Thereafter, the core wire 11a exiting the light irradiating apparatus 24A enters the resin applying chamber 21B, which contains the mixture liquid 22 comprising the light curing resin containing the abrasive grains 22c and the filler 22b.

Other structures of the manufacturing apparatus shown in FIG. 5 are the same as that of the manufacturing apparatus shown in FIG. 3, and descriptions thereof will be omitted.

A description will now be given of an example of the abrasive wire 11A which was fabricated by the manufacturing apparatus show in FIG. 5.

In this example, a piano wire having a diameter of 0.20 mm was used for the core wire 11a. Acrylate type light curing resin adhesive was placed in the first chamber 21A. The core wire 11a was introduced into the first chamber 21A so as to form the light curing resin adhesive layer 11bA. The core wire 11a was passed through the diameter setting jig 23A having an inner diameter of 0.23 mm. Then, the light curing resin adhesive was cured by an ultraviolet light having a peak wavelength around 354 nm, which was irradiated by the high-voltage mercury lamp 24A. Accordingly, the light curing resin adhesive layer 11bA was formed on the core wire 11a.

Fine powder of copper having an average diameter of 2 $\mu$m was added to a radical polymerization type light curing resin liquid so that the mixture contained 30% fine copper powder by weight. The radical polymerization type light curing resin liquid contained an acrylate prepolymer (an oligomer or a monomer) and 1% (1 wt %) photoinitiator of an acetophenone derivative by weight. The solution was mixed by a homogenizer for 10 minutes. Diamond abrasive grains having a diameter of 30 $\mu$m to 40 $\mu$m, which corresponds to 5 volume percent, were wetted with a small amount of ethyl alcohol, and added to the resin liquid so as to prepare the mixture liquid 22. The mixture liquid 22 was mixed by a homogenizer for 10 minutes. The thus-prepared mixture liquid 22 was placed in the resin applying chamber 21B.

The core wire 11a exiting the mercury lamp 24A was introduced into the resin applying chamber 21B so that the piano wire was covered by the mixture liquid 22 including the diamond abrasive grains. Then, the core wire 11a was passed through the diameter setting jig 23 having an opening of which diameter was about 0.27 mm. The piano wire was passed through the light irradiating apparatus 24 which comprises a high-voltage mercury lamp having a peak wavelength around 354 nm. Thus, the abrasive wire 11A having a diameter of 0.25 mm to 0.26 mm was obtained.

It should be noted that the light curing resin layer 11c of this example was formed by the same material as that of the example of the abrasive wire 11 according to the above-mentioned first embodiment of the present invention.

A 3- inch diameter silicon ingot was cut by the above-mentioned example of the abrasive wire 11A at a cutting speed of 300 m/min. There was no remarkable abrasion of the bonding layer (light curing resin layer 11c). The average cutting efficiency was more than 35 mm$^2$/min.

(Third Embodiment)

Figure 6:
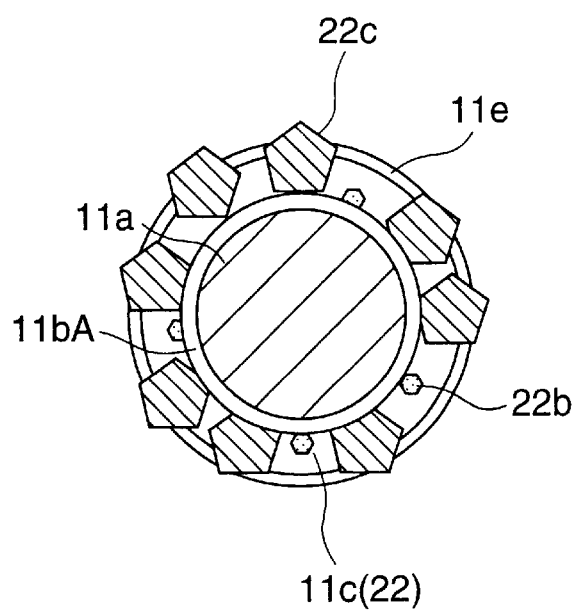
FIG. 6 is an illustration of a cross section of an abrasive wire according to a third embodiment of the present invention.

FIG. 6 is an illustration of an abrasive wire according to a third embodiment of the present invention. In FIG. 6, parts that are the same as the parts shown in FIG. 4 are given the same reference numerals, and descriptions thereof will be omitted. The abrasive wire 11B according to the third embodiment of the present invention has the same structure as the second embodiment of the present invention shown in FIG. 4 except for an outer resin layer 11e being provided on the light curing resin layer 11c.

The outer resin layer 11e is formed by a light curing resin having abrasion resistance superior to that of the light curing resin forming the light curing resin layer 11c. The outer resin layer 11e can be formed in the same manner as that of the light curing resin abrasive layer 11bA or the light curing resin layer 11c. The outer resin layer 11e may be provided with other characteristics such as low friction or chemical stability, if necessary, by changing the material or the filler.

(Fourth Embodiment)

Figure 7:
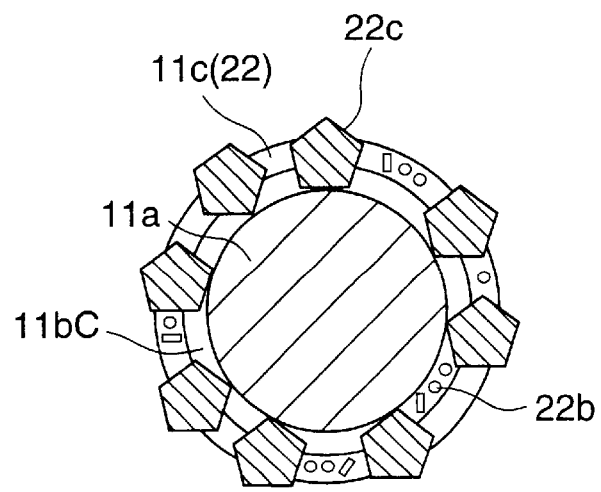
FIG. 7 is an illustration of a cross section of an abrasive wire according to a fourth embodiment of the present invention.

A description will now be given, with reference to FIG. 7, of a fourth embodiment of the present invention. FIG. 7 is an illustration of an abrasive wire according to the fourth embodiment of the present invention. In FIG. 7, parts that are the same as the parts shown in FIG. 4 are given the same reference numerals, and descriptions thereof will be omitted.

The abrasive wire 11C according to the fourth embodiment of the present invention has the same structure as the abrasive wire 11A shown in FIG. 4 except for the abrasive grains 22c being bonded to the core wire 11a by a light curing resin adhesive layer 11bC. That is, in the present embodiment, the abrasive grains 22c are added not to the light curing resin forming the light curing resin layer 11c but to the light curing resin adhesive forming the light curing resin adhesive layer 11bC. Thus, the abrasive grains 22c are securely bonded to the core wire 11a by the light curing resin adhesive.

In the present embodiment, the light curing resin adhesive layer 11bC does not contain the filler 22b since the filer 22b may adversely affect the bonding property of the light curing resin adhesive. Thus, the curing process of the light curing resin adhesive does not occur before light curing resin adhesive is irradiated by the light projected by the light irradiating apparatus. It should be noted that the filler 22b is added to the light curing resin forming the light curing resin layer 11c.

According to the present embodiment, since the abrasive grains 22c are bonded to the core wire 11a by the light curing resin adhesive having an adhesion force stronger than that of the light curing resin forming the light curing resin layer 11c, the abrasive grains 22c are securely bonded to the core wire 11a.

A description will now be given of an example of the abrasive wire 11C. The abrasive wire 11C can be fabricated by a manufacturing apparatus similar to the manufacturing apparatus show in FIG. 5.

In this example, a piano wire having a diameter of 0.20 mm was used for the core wire 11a. First, the core wire 11a was subjected to a degreasing process, and then a silane coupling agent as a primer was applied to the core wire 11a.

A radical polymerization type light curing resin adhesive liquid comprising an acrylate light curing resin adhesive and 1% photoinitiator of an acetophenone derivative by weight was prepared. Then, diamond abrasive grains having a diameter of 30 µm to 40 µm, which corresponds to 5 volume percent, were wetted with a small amount of ethyl alcohol, and added to the light curing resin adhesive liquid. The mixture liquid was mixed by a homogenizer for 10 minutes. The thus-prepared mixture liquid was placed in the first chamber 21A.

The core wire 11a provided with the primer was introduced into the first chamber 21A so as to form the light curing resin adhesive layer 11bC. The core wire 11a was passed through the diameter setting jig 23A having an inner diameter of 0.23 mm. Then, the light curing resin adhesive was cured by an ultraviolet light having a peak wavelength around 354 nm, which was irradiated by the high-voltage mercury lamp 24A. Accordingly, the light curing resin adhesive layer 11bC (first layer) was formed on the core wire 11a.

Fine powder of copper having an average diameter of 2 µm was added to a radical polymerization type light curing resin liquid so that the mixture contained 30% fine copper powder by weight. The radical polymerization type light curing resin liquid contained an acrylate prepolymer (an oligomer or a monomer) and 1% photoinitiator of an acetophenone derivative by weight. The solution was mixed by a homogenizer for 10 minutes so as to prepare the mixture liquid 22. The thus-prepared mixture liquid 22 was placed in the resin applying chamber 21B.

Thereafter, the core wire 11a exiting the mercury lamp 24A was introduced into the resin applying chamber 21B so that the mixture 22 was applied to the core wire 11a covered with the light curing resin adhesive layer 11bC which bonds the diamond abrasive grains to the core wire 11a. Then, the core wire 11a was passed through the diameter setting jig 23 having an opening of diameter about 0.27 mm. The core wire 11a was passed through the light irradiating apparatus 24 which comprises a high-voltage mercury lamp having a peak wavelength around 354 nm. Thus, the light curing resin layer 11c was formed on the light curing resin adhesive layer 11bC, and, thereby, the abrasive wire 11C having a diameter of 0.25 mm to 0.26 mm was obtained.

It should be noted that the light curing resin layer 11c of this example was formed by the same material as that of the example of the abrasive wire 11 according to the above-mentioned first embodiment of the present invention.

A 3-inch diameter silicon ingot was cut by the above-mentioned example of the abrasive wire 11C at a cutting speed of 300 m/min. There was no remarkable abrasion of the bonding layer (light curing resin layer 11c). The average cutting efficiency was more than 35 mm²/min.

(Fifth Embodiment)

Figure 8:
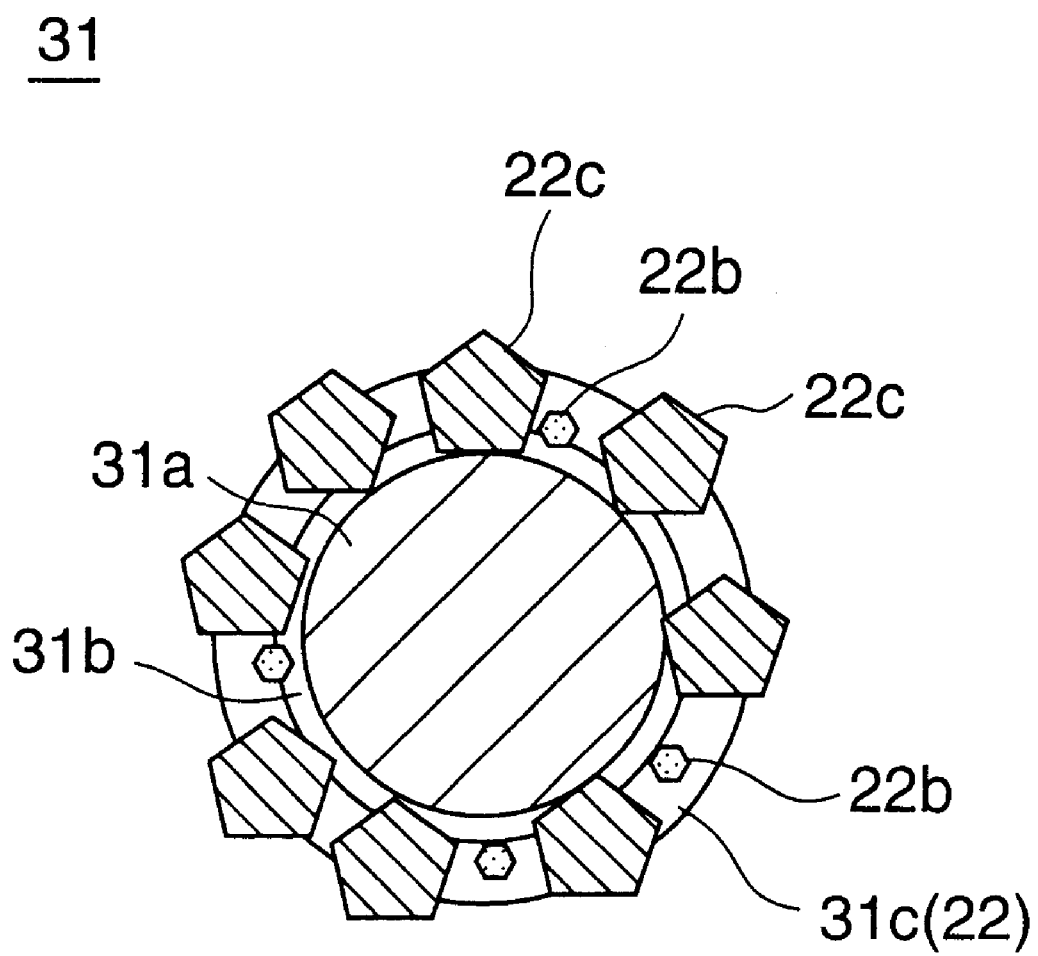
FIG. 8 is an illustration of a cross section of an abrasive wire according to a fifth embodiment of the present invention.
Figure 9:
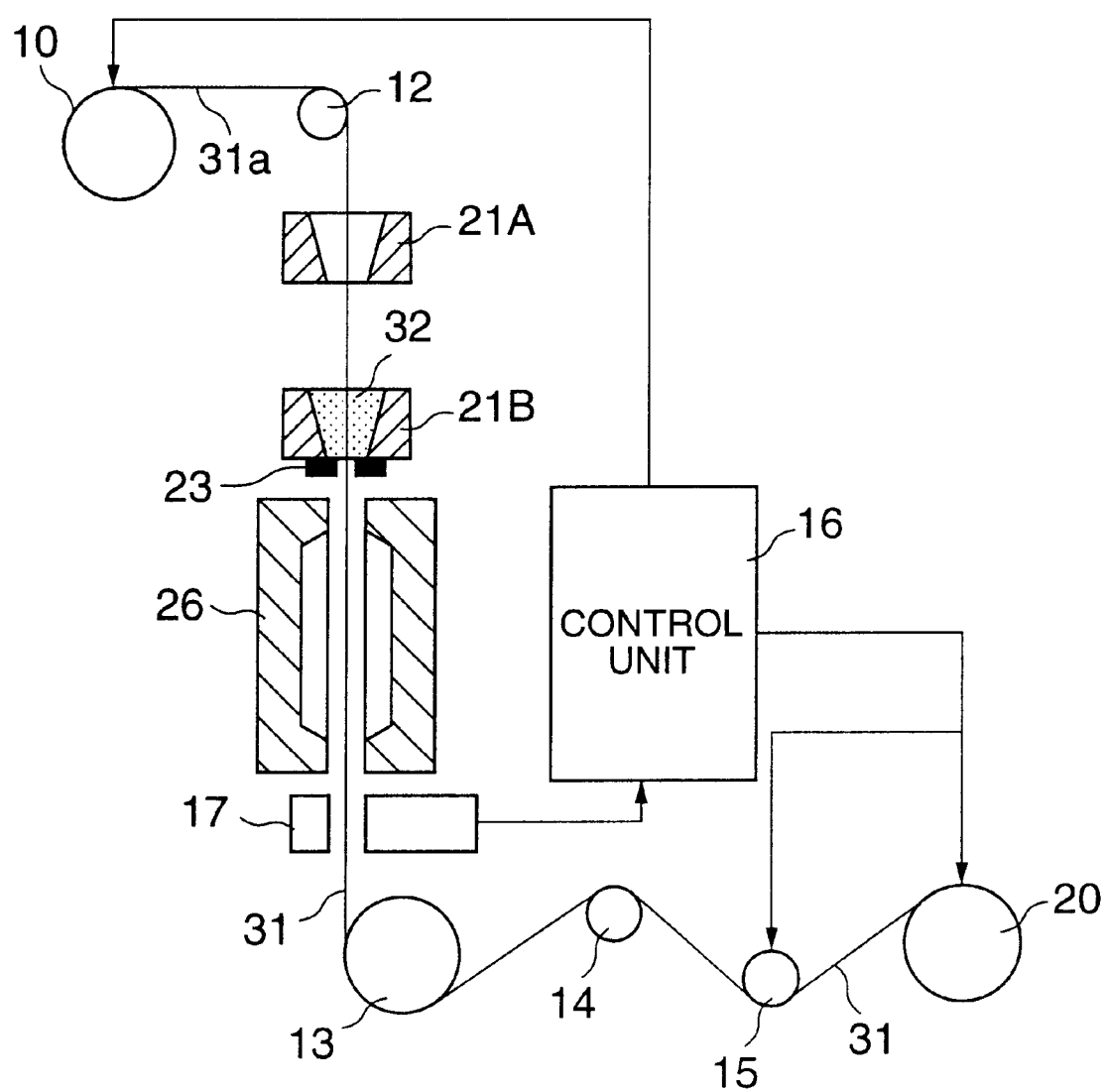
FIG. 9 is a schematic illustration of a manufacturing apparatus for manufacturing the abrasive wire according to the fifth embodiment of the present invention.

A description will now be given, with reference to FIGS. 8 and 9, of a fifth embodiment of the present invention. FIG. 8 is an illustration of a cross section of an abrasive wire according to the fifth embodiment of the present invention. FIG. 9 is a schematic illustration of a manufacturing apparatus for manufacturing the abrasive wire according to the fifth embodiment of the present invention.

The abrasive wire 31 according to the fifth embodiment of the present invention comprises a core wire 31a, abrasive grains 22c bonded to the core wire 31a and an electron beam curing resin layer 31c formed on the core wire 31a so as to bond the abrasive grains 22c to the core wire 31a. A primer layer 31b is provided between the core wire 31a and the electron beam curing resin layer 31c so that the electron beam curing resin layer 31c securely adheres to the core wire 31a. This prevents removal of the electron beam curing resin layer 31c from the abrasive wire 31 during a cutting operation, thereby increasing the service life of the abrasive wire 31. Additionally, the electron beam curing resin layer 31c contains a filler 22b so as to increase the mechanical strength and heat resistance of the abrasive wire 31.

Specifically, the core wire 31a is made of a metal wire such as a piano wire, a bronze coated piano wire or a stainless steel wire. The core wire 31a can also be made of an inorganic material such as a glass fiber or an organic material such as nylon. The core wire 31a can be a solid wire or a twisted wire.

The abrasive grains 22c are preferably made of a hard material such as a diamond, cubic boron nitride (CBN), alumina or silicon carbide. A diamond grain is most preferable for the abrasive grains 22c since the diamond grain has superiority in cutting ability.

The electron beam curing resin layer 31c is made of an electron beam curing resin which can be polymerized within one second under irradiation of an electron beam. Thus, the abrasive wire 31 can be fabricated at a speed more than one kilometer per minute, thereby enabling the fabrication of a long abrasive wire at a low cost.

As for the filler 22b added to the electron beam curing resin, metal particles having a diameter of 0.1 µm to 15 µm and/or inorganic particles having an average diameter of 0.1 µm to 15 µm may be used. Metal fibers having a diameter of 0.1 µm to 15 µm and a length of 1 µm to 200 µm and/or inorganic fibers having a diameter of 0.1 µm to 15 µm and a length of 1 µm to 200 µm may be used. The filler 22b is added to the electron beam curing resin so that the mixture contained 5% to 90% filler 22b by weight. The addition of the filler 22b increases the mechanical strength and the heat resistance of the abrasive wire 31.

It should be noted that when a light curing resin is used as is the case in the above-mentioned embodiments, the curing speed of the light curing resin may be reduced or the light curing resin may not be completely cured due to transmission, absorption or reflection of light at or near the particles of the filler 22b. However, such a problem can be eliminated by using the electron beam curing resin since the transmissivity of the electron beam is more than three times as much as that of a light beam such as an ultraviolet beam.

A description will now be given, with reference to FIG. 9, of a manufacturing method of the abrasive wire 31 according to the fifth embodiment of the present invention.

The core wire 31a wound on a feed roller 10 is supplied to a first chamber 21A via a roller 12 after the core wire 31a is subjected to a degreasing process. The first chamber 21A contains a primer so that the primer layer 31b is formed on the core wire 31a while the core wire 31a passes through the first chamber 21A. The primer layer 31b improves adhesion of the electron beam curing resin to the core wire 31a and promotes the cure of the electron beam curing resin. As for the primer forming the primer layer 31b, a polymerization accelerator or a coupling agent such as a silane coupling agent can be used.

Japanese Laid-Open Patent Application NO. 10-328932 teaches provision of unevenness on the surface of a core wire so as to increase adhesion of a resin layer to the core wire. If such a structure is applied to the abrasive wire 31, the mechanical strength of the abrasive wire 31 may be decreased. However, the formation of the primer layer 31b does not influence the mechanical strength of the abrasive wire 31.

The core wire 31a on which the primer layer 31b has been formed is passed through a resin applying chamber 21B having a funnel shape. The resin applying chamber 21B contains a mixture liquid 32 comprising the electron beam curing resin containing the abrasive grains 22c and the filler 22b. The abrasive grains 22c adhere to the core wire 31a with the electron beam curing resin while the core wire 31a passes through the resin applying chamber 21B. After passing the resin applying chamber 21B, the core wire 31a is passed through a diameter setting jig 23 so as to remove any excessive amount of the mixture liquid 32 adhering on the core wire 31a. Accordingly, the electron beam curing resin layer 31c is adjusted to have a predetermine thickness, and, thereby, the abrasive wire 31 is set to have a predetermined diameter.

The core wire 31a passing the diameter jig 23 enters an electron beam irradiating apparatus (electron beam accelerator) 26 which projects an electron beam onto the mixture liquid applied to the core wire 31a. The electron beam curing resin contained in the mixture liquid 32 is cured by the electron beam projected by the electron beam irradiating apparatus 26, and, thereby, the electron beam curing resin layer 31c is formed. Accordingly, the abrasive grains 22c are securely bonded to the core wire 31a by the electron beam curing resin layer 31c, and, thereby, the abrasive wire 31 shown in FIG. 8 is formed.

After the thus-formed abrasive wire 31 exits the electron beam irradiating apparatus 26, the diameter of the abrasive wire 31 is measured by a diameter measuring device 17. The measurement of the diameter measuring device 17 are supplied to a control unit 16. The diameter measuring device 17 includes three non-contact displacement sensors arranged in equiangular positions surrounding the abrasive wire 31 exiting the electron beam irradiating apparatus 26 so as to measure eccentricity of the electron beam curing resin layer 31c with respect to the core wire 31a as well as the diameter of the abrasive wire 31. Specifically, the diameter measuring device 17 is capable of measuring the thickness of the electron beam curing resin layer 31c at three locations around the circumference of the abrasive wire 31.

The control unit 16 detects eccentricity between the abrasive wire 31 and the diameter setting jig 23 based on the measurement of the diameter measuring device 17 so as to control the position of the diameter setting jig 23 so that the abrasive wire 31 is always located in the center of the diameter setting jig 23. The relative position of the core wire 31a with respect to the diameter setting jig 23 can be changed by moving the diameter setting jig 23 or moving a wire position adjusting roller (not shown in the figure). Additionally, the control unit 16 controls the feed speed of the core wire 31a so that the thickness of the electron beam curing resin layer 31c becomes uniform in the longitudinal direction as well as radial directions of the core wire 31a.

After passing the diameter measuring device 17, the abrasive wire 31 is directed to a winding roller 20 via rollers 13, 14 and 15, and is wound on the winding roller 20. The winding speed of the winding roller 20 is controlled by the control unit 16. Additionally, the tension of the abrasive wire 31 is controlled by the roller 15.

It should be noted that the process for curing the electron beam curing resin may be performed within a nitrogen atmosphere or an oxygen reduced atmosphere so as to achieve stable polymerization of the electron beam curing resin.

According to the above-mentioned abrasive wire manufacturing apparatus, the abrasive wire 31 can be continuously fabricated at a speed of a few kilometers per minutes since the electron beam curing resin, which bonds the abrasive grains 22c to the core wire 31a, is cured in a short time, that is, within one second. Additionally, since the diameter of the abrasive wire 31 is adjusted by the diameter setting jig 23 under the control of the control unit 16, the abrasive wire 31 has a uniform thickness along the longitudinal direction as well as radial directions. Accordingly, when a silicon ingot is cut by the abrasive wire 31, the kerf loss is reduced and a good cutting quality can be achieved.

A description will now be given of an example of the abrasive wire 31, which was fabricated by the abrasive wire manufacturing apparatus shown in FIG. 9.

In this example, a piano wire having a diameter of 0.20 mm was used for the core wire 31a. First, the core wire 31a was subjected to a degreasing process, and then a silane coupling agent as a primer was applied to the core wire 31a.

Fine powder of copper having an average diameter of 2 $\mu$m was added to a radical polymerization type electron beam curing resin liquid so that the mixture contained 30% fine copper powder by weight. The radical polymerization type electron beam curing resin liquid contained an acrylate prepolymer (an oligomer or a monomer) and 1% photoinitiator of an acetophenone derivative by weight. The solution was mixed by a homogenizer for 10 minutes. Diamond abrasive grains having a diameter of 30 $\mu$m to 40 $\mu$m, which corresponds to 5 volume percent, were wetted with a small amount of ethyl alcohol, and added to the resin liquid so as to prepare the mixture liquid 32. The mixture liquid 32 was mixed by a homogenizer for 10 minutes. The thus-prepared mixture liquid 32 was provided to the resin applying chamber 21B. Thereafter, the piano wire which has been subjected to the primer process was introduced into the resin applying chamber 21B so that the piano wire was covered by the mixture liquid 32 including the diamond abrasive grains. Then, the piano wire was passed through the diameter setting jig 23 having an opening of diameter about 0.27 mm. The piano wire was passed through the electron beam irradiating apparatus having a capacity of about 300 keV. An abrasive wire having a diameter of 0.25 mm to 0.26 mm was obtained.

The electron beam curing resin used in the above-mentioned example was a radical polymerization type resin which generates radical polymerization by being irradiated by the electron beam. However, the oligomer and the monomer are not limited to those used in the above-mentioned example.

As for the oligomer or the monomer, polyethylene, polypropylene, hyparon, polystyrene, poly(acrylic acid), poly(vinyl alcohol), poly(vinyl acetate), nylon, polychloroprene, poly(dimethyl siloxane), epoxide, polyester, polyvinyl, poly(vinyl butyral), polyurethane, polyamide, melamine or urea may be used.

Additionally, the fine powder of copper was used as the filler 22b in the above-mentioned example, the filler 22b is not limited to the fine powder of copper. That is, any material can be used as long as the material can improve the mechanical strength or the abrasion resistance of the electron beam curing resin layer 31b without adversely affecting the completion of the cure of the electron beam curing resin. As for the filler, fine metal powder, metal oxide, metal carbide or non-metal oxide or carbide such as a semiconductor device material may be used. The filler may be in the form of a particle or a fiber.

A 3-inch diameter silicon ingot was cut by the above-mentioned example of the abrasive wire 31 at a cutting speed of 300 m/min. There was no remarkable abrasion of the bonding layer (electron beam curing resin layer 31c). The average cutting efficiency was more than 50 mm$^2$/min.

(Sixth Embodiment)

Figure 10:
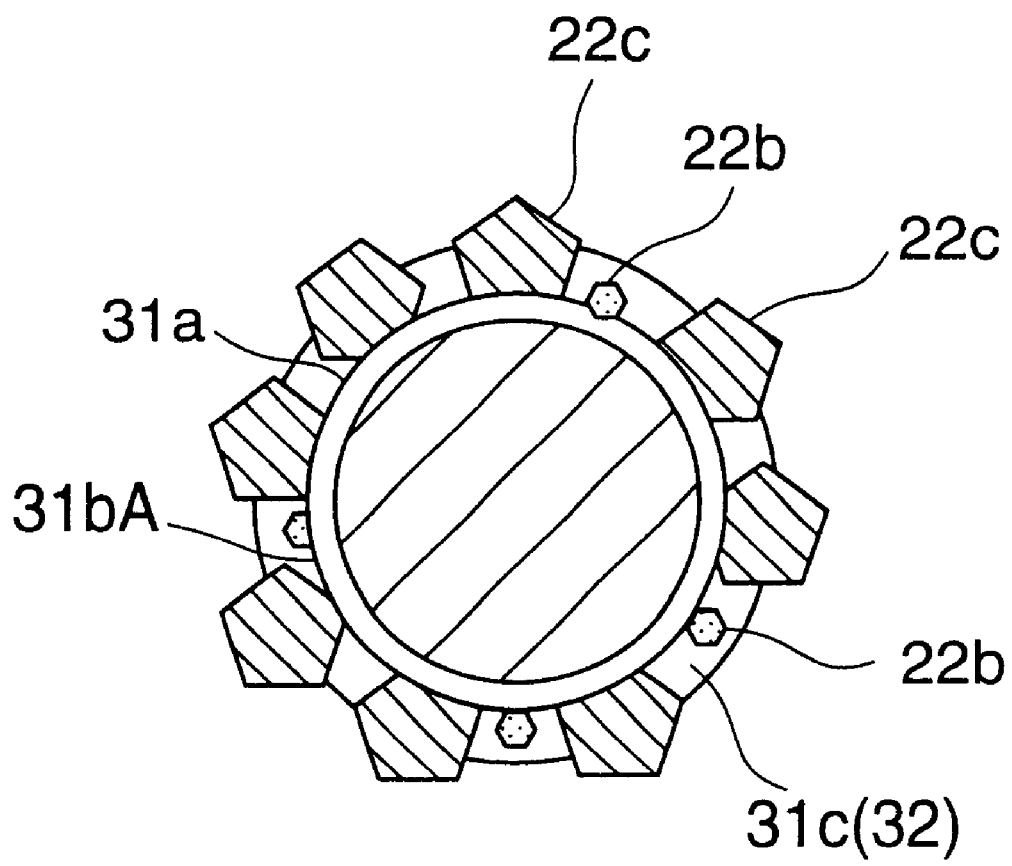
FIG. 10 is an illustration of a cross section of an abrasive wire according to a sixth embodiment of the present invention.

A description will now be given of a sixth embodiment of the present invention. FIG. 10 is an illustration of a cross section of an abrasive wire according to the sixth embodiment of the present invention. In FIG. 10, parts that are the same as the parts shown in FIG. 8 are given the same reference numerals, and descriptions thereof will be omitted.

The abrasive wire 31A according to the sixth embodiment of the present invention has the same structure as that of the abrasive wire 31 according to the fifth embodiment of the present invention except for the primer layer 31b of the abrasive wire 31 being replaced by an electron beam curing resin adhesive layer 31bA. The electron beam curing resin adhesive forming the electron beam curing resin adhesive layer 31bA adheres to the core wire 31a stronger than the electron beam curing resin forming the electron beam curing resin layer 31c. Additionally, the electron beam curing resin forming the electron beam curing resin layer 31c strongly adheres to the electron beam curing resin adhesive layer 31bA. Accordingly, the electron beam curing resin layer 31c adheres to the core wire 31a stronger than when the electron beam curing resin layer 31c is directly formed on the core wire 31a without the electron beam curing resin adhesive layer 31bA. Thus, the abrasive grains 22c are more firmly bonded to the core wire 31a than when the abrasive grains 22c are bonded to the core wire 31a solely by the electron beam curing resin layer 31c.

Figure 11:
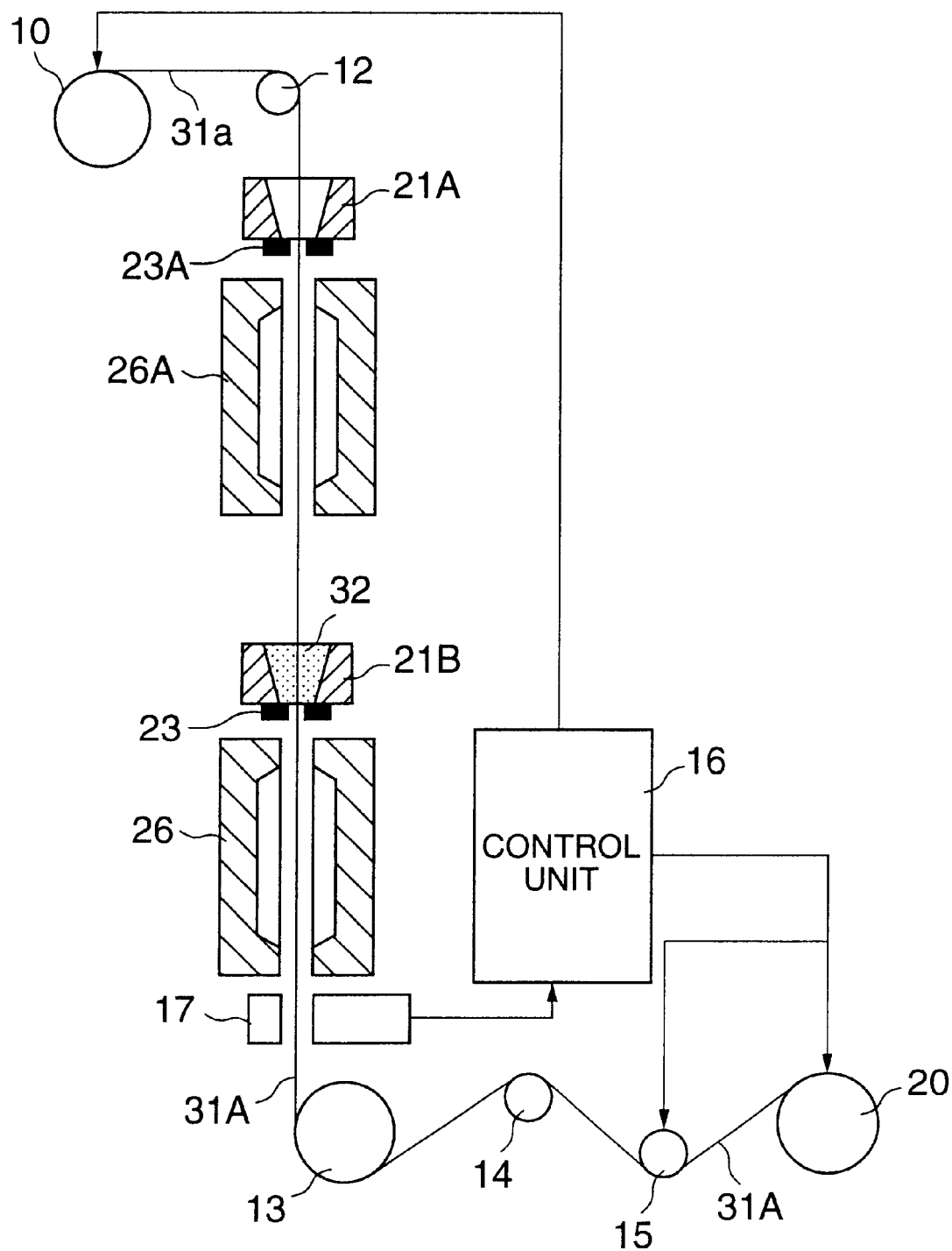
FIG. 11 is a schematic illustration of a manufacturing apparatus for manufacturing the abrasive wire according to the sixth embodiment of the present invention.

A description will now be given, with reference to FIG. 11, of a manufacturing method of the abrasive wire 31A according to the sixth embodiment of the present invention. FIG. 11 is a schematic illustration of a manufacturing apparatus for manufacturing the abrasive wire 31A according to the sixth embodiment of the present invention. In FIG. 11, parts that are the same as the parts shown in FIG. 9 are given the same reference numerals, and descriptions thereof will be omitted.

In the manufacturing apparatus shown in FIG. 11, the electron beam curing resin adhesive mixture forming the electron beam curing resin adhesive layer 31bA is provided in the first chamber 21A. A diameter setting jig 23A having the same structure as the diameter setting jig 23 is provided at the exit of the chamber 21A. The diameter setting jig 23A removes any excessive amount of the electron beam curing resin adhesive adhering to the core wire 31a.

After exiting the diameter setting jig 23A, the core wire 31a enters an electron beam irradiating apparatus 26A having the same structure as the electron beam irradiating apparatus 24. Thus, the electron beam curing resin adhesive adhering to the core wire 31a is cured by the electron beam projected by the electron beam irradiating apparatus 26A. Thereafter, the core wire 31a exiting the electron beam irradiating apparatus 26A enters the resin applying chamber 21B, which contains the mixture liquid 32 comprising the electron beam curing resin containing the abrasive grains 22c and the filler 22b.

Other structures of the manufacturing apparatus shown in FIG. 11 are the same as that of the manufacturing apparatus shown in FIG. 9, and descriptions thereof will be omitted.

A description will now be given of an example of the abrasive wire 31A which was fabricated by the manufacturing apparatus show in FIG. 11.

In this example, a piano wire having a diameter of 0.20 mm was used for the core wire 31a. Acrylate type electron beam curing resin adhesive was filled in the first chamber 21A. The core wire 31a was introduced into the first chamber 21A so as to form the electron beam curing resin adhesive layer 31bA. The core wire 31a was passed through the diameter setting jig 23A having an inner diameter of 0.23 mm. Then, the electron beam curing resin adhesive was cured by an electron beam irradiated by the electron beam irradiating apparatus 26A having a capacity of 300 KeV. Accordingly, the electron beam curing resin adhesive layer 31bA was formed on the core wire 31a.

Fine powder of copper having an average diameter of 2 $\mu$m was added to a radical polymerization type electron beam curing resin liquid so that the mixture contained 30% fine copper powder by weight. The radical polymerization type electron beam curing resin liquid contained an acrylate prepolymer (an oligomer or a monomer) and 1% of a photoinitiator of an acetophenone derivative by weight. The solution was mixed by a homogenizer for 10 minutes. Diamond abrasive grains having a diameter of 30 $\mu$m to 40 $\mu$m, which corresponds to 5 volume percent, were wetted with a small amount of ethyl alcohol, and added to the resin liquid so as to prepare the mixture liquid 22. The mixture liquid 22 was mixed by a homogenizer for 10 minutes. The thus-prepared mixture liquid 22 was provided to the resin applying chamber 21B.

The core wire 31a exiting the electron beam irradiating apparatus 26A was introduced into the resin applying chamber 21B so that the core wire 31a having the electron beam resin adhesive layer 31bA was covered by the mixture liquid 32 including the diamond abrasive grains. Then, the core wire 31a was passed through the diameter setting jig 23 having an opening of which diameter was about 0.27 mm. The core wire 31a was passed through the electron beam irradiating apparatus 26 having a capacity of 300 KeV. Thus, the abrasive wire 31A having a diameter of 0.25 mm to 0.26 mm was obtained.

It should be noted that the electron beam curing resin layer 31c of this example was formed by the same material as that of the example of the abrasive wire 31 according to the above-mentioned first embodiment of the present invention.

In the present embodiment, the electron beam curing resin adhesive layer 31bA (first layer) formed on the core wire 31a was made of the electron beam curing resin adhesive. However, the electron beam curing resin adhesive layer 31bA may be replaced by the light curing resin adhesive layer 11bA shown in FIG. 4.

A 3-inch diameter silicon ingot was cut by the above-mentioned example of the abrasive wire 31A at a cutting speed of 300 m/min. There was no remarkable abrasion of the bonding layer (electron beam curing resin layer 31c). The average cutting efficiency was more than 50 mm$^2$/min.

(Seventh Embodiment)

Figure 12:
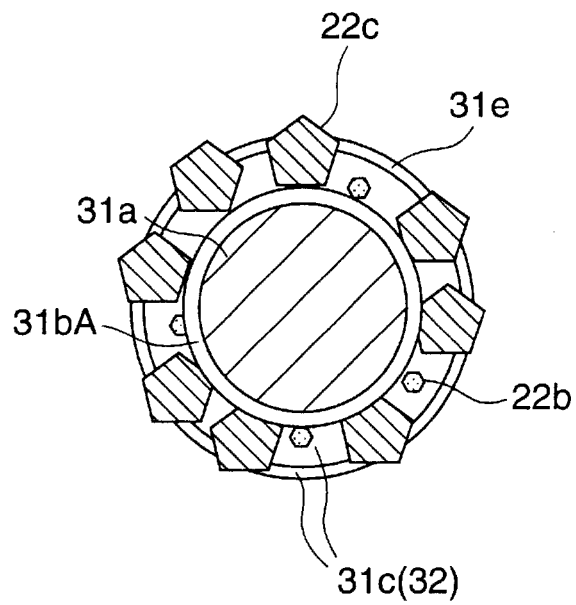
FIG. 12 is an illustration of a cross section of an abrasive wire according to a seventh embodiment of the present invention.

FIG. 12 is an illustration of an abrasive wire according to a seventh embodiment of the present invention. In FIG. 12, parts that are the same as the parts shown in FIG. 10 are given the same reference numerals, and descriptions thereof will be omitted. The abrasive wire 31B according to the seventh embodiment of the present invention has the same structure as the sixth embodiment of the present invention shown in FIG. 10 except for an outer resin layer 31e being provided on the electron beam curing resin layer 31c.

The outer resin layer 31e is formed by an electron beam curing resin having abrasion resistance superior to that of the electron beam curing resin forming the electron beam curing resin layer 31c. The outer resin layer 31e can be formed in the same manner as that of the electron beam curing resin abrasive layer 31bA or the electron beam curing resin layer 31c. The outer resin layer 31e may be provided with other characteristics such as low friction or chemical stability, if necessary, by changing the material or the filler.

(Eighth Embodiment)

Figure 13:
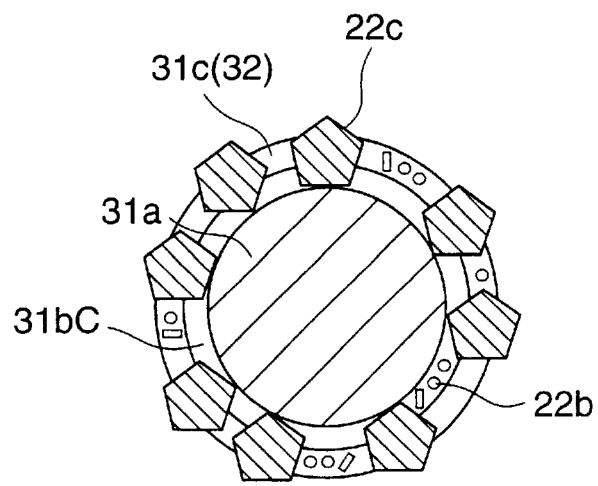
FIG. 13 is an illustration of a cross section of an abrasive wire according to an eighth embodiment of the present invention.

A description will now be given, with reference to FIG. 13, of an eighth embodiment of the present invention. FIG. 13 is an illustration of an abrasive wire according to the eighth embodiment of the present invention. In FIG. 13, parts that are the same as the parts shown in FIG. 10 are given the same reference numerals, and descriptions thereof will be omitted.

The abrasive wire 31C according to the eighth embodiment of the present invention has the same structure as the abrasive wire 31A shown in FIG. 10 except for the abrasive grains 22c being bonded to the core wire 31a by an electron beam curing resin adhesive layer 31bC. That is, in the present embodiment, the abrasive grains 22c are added not to the electron beam curing resin forming the electron beam curing resin layer 31c but to the electron beam curing resin adhesive forming the electron beam curing resin adhesive layer 31bC. Thus, the abrasive grains 22c are securely bonded to the core wire 31a by the electron beam curing resin adhesive.

In the present embodiment, the electron beam curing resin adhesive layer 31bC does not contain the filler 22b since the filer 22b may adversely affect the bonding properties of the electron beam curing resin adhesive. Thus, the curing process of the electron beam curing resin adhesive does not occur before electron beam curing resin adhesive is irradiated by the light projected by the light irradiating apparatus. It should be noted that the filler 22b is added to the electron beam curing resin forming the electron beam curing resin layer 31c.

According to the present embodiment, since the abrasive grains 22c are bonded to the core wire 31a by the electron beam curing resin adhesive having an adhesion force stronger than that of the electron beam curing resin forming the electron beam curing resin layer 31c, the abrasive grains 22c are securely bonded to the core wire 31a.

A description will now be given of an example of the abrasive wire 31C. The abrasive wire 31C can be fabricated by a manufacturing apparatus similar to the manufacturing apparatus shown in FIG. 11.

In this example, a piano wire having a diameter of 0.20 mm was used for the core wire 31a. First, the core wire 31a was subjected to a degreasing process, and then a silane coupling agent as a primer was applied to the core wire 31a.

A radical polymerization type electron beam curing resin adhesive liquid comprising an acrylate electron beam curing resin adhesive and 1% of an initiator of an acetophenone derivative by weight was prepared. Then, diamond abrasive grains having a diameter of 30 µm to 40 µm, which corresponds to 5 volume percent, were wetted with a small amount of ethyl alcohol, and added to the electron beam curing resin adhesive liquid. The mixture liquid was mixed by a homogenizer for 10 minutes. The thus-prepared mixture liquid was placed in the first chamber 21A.

The core wire 31a provided with the primer was introduced into the first chamber 21A so as to form the electron beam curing resin adhesive layer 31bC. The core wire 31a was passed through the diameter setting jig 23A having an inner diameter of 0.23 mm. Then, the electron beam curing resin adhesive was cured by an electron beam irradiating apparatus having a capacity of 300 keV. Accordingly, the electron beam curing resin adhesive layer 31bC (first layer) was formed on the core wire 31a.

Fine powder of copper having an average diameter of 2 µm was added to a radical polymerization type electron beam curing resin liquid so that the mixture contained 30% fine copper powder by weight. The radical polymerization type electron beam curing resin liquid contained an acrylate prepolymer (an oligomer or a monomer) and 1% of an initiator of an acetophenone derivative by weight. The solution was mixed by a homogenizer for 10 minutes so as to prepare the mixture liquid 32. The thus-prepared mixture liquid 32 was provided to the resin applying chamber 21B.

Thereafter, the core wire 31a exiting the mercury lamp 24A was introduced into the resin applying chamber 21B so that the mixture 32 was applied to the core wire 31a covered with the electron beam curing resin adhesive layer 31bC which bonds the diamond abrasive grains to the core wire 31a. Then, the core wire 31a was passed through the diameter setting jig 23 having an opening of which diameter was about 0.27 mm. The core wire 31a was passed through the electron beam irradiating apparatus 26 which projects an electron beam to the mixture liquid 32. Thus, the electron beam curing resin layer 31c was formed on the electron beam curing resin abrasive layer 31bC, and, thereby, the abrasive wire 31C having a diameter of 0.25 mm to 0.26 mm was obtained.

It should be noted that the electron beam curing resin layer 31c of this example was formed by the same material as that of the example of the abrasive wire 31 according to the above-mentioned fifth embodiment of the present invention.

A 3-inch diameter silicon ingot was cut by the above-mentioned example of the abrasive wire 31C at a cutting speed of 300 m/min. There was no remarkable abrasion of the bonding layer (electron beam curing resin layer 31c). The average cutting efficiency was more than 50 mm$^2$/min.

The present invention is not limited to the specifically disclosed embodiments, and variations and modifications may be made without departing from the scope of the present invention.

The present application is based on Japanese priority applications No. 11-27857 filed on Feb. 4, 1999, No. 11-202224 file on Jul. 15, 1999, No. 11-202225 file on Jul. 15, 1999, No.11-203220 file on Jul. 16, 1999 and No. 11-203222 filed on Jul. 16, 1999, the entire contents of which are hereby incorporated by reference.

What is claimed is:

1. An abrasive wire comprising:

a core wire;

abrasive grains provided around the core wire; and a bonding layer including a plurality of layers each of which is made of a light curing resin, each of the plurality of layers being made of a different kind of light curing resin.

2. The abrasive wire as claimed in claim 1, wherein a first layer of the plurality of layers contacts the core wire and is made of a light curing resin adhesive which adheres to the core wire more strongly than do others of the plurality of layers of the bonding layer.

3. The abrasive wire as claimed in claim 1, wherein the bonding layer contains inorganic particles as a filler so that the bonding layer has a diameter of approximately 0.1 µm to 15 µm and so that the filler is approximately 5% to 90% by weight of the bonding layer.

4. The abrasive wire as claimed in claim 3, wherein the filler comprises metal particles.

5. The abrasive wire as claimed in claim 1, wherein the bonding layer contains inorganic fibers as a filler so that the bonding layer has a diameter of approximately 0.1 µm to 15 µm and a length of approximately 1 µm to 200 µm and so that the filler is approximately 5% to 90% by weight of the bonding layer.

6. The abrasive wire as claimed in claim 1, wherein the filler comprises metal fibers.

7. The abrasive wire as claimed in claim 1, further comprising a primer layer between the core wire and the bonding layer so as to increase adhesion of the bonding layer to the core wire.

* * * * *

UNITED STATES PATENT AND TRADEMARK OFFICE
CERTIFICATE OF CORRECTION

PATENT NO.     : 6,463,921 B2                                              Page 1 of 1
DATED          : October 15, 2002
INVENTOR(S)    : Shimazaki et al.

It is certified that error appears in the above-identified patent and that said Letters Patent is hereby corrected as shown below:

<u>Title page,</u>
Item [45], and the Notice information should read as follows:

-- [45] **Date of Patent: \*Oct. 15, 2002**

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended of adjusted under 35 U.S.C. 154(b) by 0 days. --

Signed and Sealed this

Fourth Day of March, 2003

JAMES E. ROGAN
*Director of the United States Patent and Trademark Office*